Figure 1:
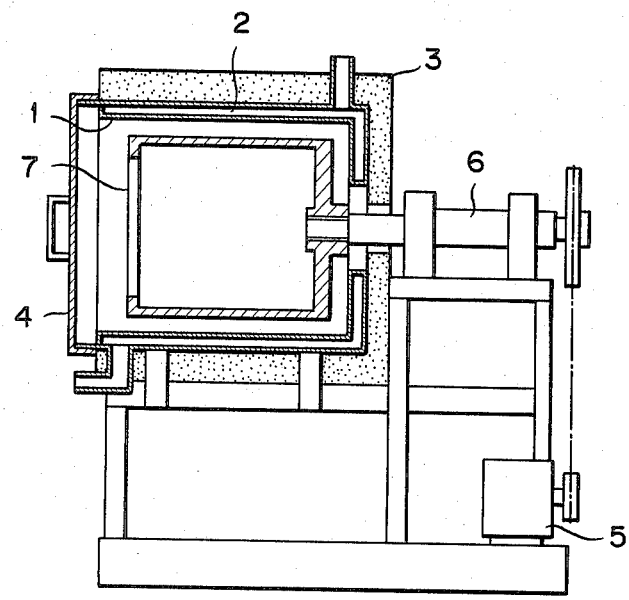

United States Patent [19]

Tarumi et al.

[11] 4,394,340
[45] Jul. 19, 1983

[54] METHOD OF PRODUCING THIN-WALLED ENDLESS BELT

[75] Inventors: Noriyoshi Tarumi, Hachioji; Hiroshi Tsuchiya, Iruma; Masakazu Kokiso, Tokyo; Hiroaki Ohta, Yokohama, all of Japan

[73] Assignees: Konishiroku Photo Industry Co., Ltd., Tokyo; Hokushin Industries Corporation, Yokohama, both of Japan

[21] Appl. No.: 315,963

[22] Filed: Oct. 28, 1981

[30] Foreign Application Priority Data

Oct. 29, 1980 [JP] Japan .................. 55/151638

[51] Int. Cl.³ .................................................. B29C 5/04
[52] U.S. Cl. ................................ 264/219; 264/310; 264/311; 264/338
[58] Field of Search ............... 264/219, 311, 310, 338

[56] References Cited

U.S. PATENT DOCUMENTS

| 3,184,525 | 5/1965 | Brandt | 264/311 |
| 3,666,528 | 5/1972 | Barnhardt | 264/311 |
| 4,107,254 | 8/1978 | Webster et al. | 264/219 |
| 4,244,912 | 1/1981 | Battice | 264/338 |

FOREIGN PATENT DOCUMENTS 712939 8/1954 United Kingdom ............... 264/311

Primary Examiner—James H. Derrington
Attorney, Agent, or Firm—Frishauf, Holtz, Goodman & Woodward

[57] ABSTRACT

An improved method of producing a thin-walled endless belt by centrifugal molding, which comprises introducing a liquid curable silicone rubber dissolved in a solvent into a rotating cylindrical mold, hardening said liquid curable silicone rubber to form a mold surface on the inner surface of said cylindrical mold, and thereafter introducing a thermosetting resin dissolved in a volatile solvent onto said mold surface to form the endless belt.

12 Claims, 1 Drawing Figure

METHOD OF PRODUCING THIN-WALLED ENDLESS BELT

This invention relates to a method of producing thin-walled endless belt used as a transfer belt in copying machines, or as members for transmitting the rotation or conveying materials in low-current audio equipment and other machines.

It has been known to prepare endless belts by a centrifugal molding method by use of synthetic rubber or synthetic resin materials in the liquid form.

However, when preparing a thin-walled endless belt having a uniform thickness by the centrifugal molding method, the axis of the inner surface of a cylindrical mold obtained by cutting must be aligned with the axis of the rotation of the cylindrical mold at an extremely high accuracy. For example, to prepare an extremely thin endless belt with a thickness of 30 to 500 μm, the eccentricity of the cylindrical mold should be within 3 μm. However, such a high accuracy cannot be achieved only by controlling the cutting accuracy for the cylindrical mold.

The object of the present invention is to provide an improved method of producing a thin-walled endless belt by the centrifugal molding method, which can easily solve the above-mentioned problem of the conventional method and can produce the product having a uniform thickness.

According to the present invention, there is provided a method in which a thermosetting resin, the raw material of an endless belt, dissolved in a volatile solvent is introduced onto the inner surface of a cylindrical mold and is centrifugally molded while heating at a predetermined temperature to produce a thin-walled endless belt, which method is characterized in that a hardened layer or a mold surface of a liquid curable silicone rubber dissolved in a solvent is formed in advance on the inner surface of a cylindrical mold by the method of centrifugal molding.

As the liquid curable silicone rubber to be used according to the present invention, there may be mentioned heat-curable silicone rubber and cold-curable silicone rubber; more particularly, dimethylpolysiloxane, methylphenylpolysiloxane and methylvinyl-polysiloxane, which are for example KE 1800A, KE 1800B, KE 1800C, etc., available from Shin-Etsu Chemical Co., Ltd. (Japan). The solvent for the silicone rubber may be, for example, an organic solvent such as silicone oil, benzene, toluene and xylene. The thermosetting resin may be, for example, polyimide, polyamide - imide and polybenzimidazole resins, and mixtures of these resins. The thermosetting resin will be selected from these resins or resin mixtures according to the operating conditions of the belt. For the thermosetting resins, any solvents that are usually used for such resins may be used, for example, N-methyl-2-pyrrolidone, N,N-dimethylacetamide, etc.

Concentrations and viscosity of the above-mentioned liquid curable silicone rubber solution may be determined arbitrarily according to what kinds of the liquid curable silicone rubber and the solvent therefor are to be used. However, the concentration should preferably be 20 to 40%, and the viscosity should preferably be 0.1 to 5 P. Concentration and viscosity of the thermosetting resin solution may be also determined arbitrarily, but preferable the concentration is 30 to 70% and the viscosity is 0.5 to 5 P.

The temperature at which the liquid curable silicone rubber is introduced and hardened to form the mold surface should preferably be about 50° to 100° C., and the time for the same should preferably be about an hour. It is preferable to further subject the thus hardened silicone rubber to a heat treatment at 100° to 200° C. for 1 to 2 hours.

The temperature at which, and the time for which, the thermosetting resin is introduced and heated should preferably be about 50° to 150° C. and not longer than an hour, respectively. It is preferable to further subject the hardened resin to a heat treatment at 250° to 350° C.

Where it is desired only to correct the eccentricity of the cylindrical mold inner surface, materials other than silicone rubbers may also be used as the material to be used in the present invention to form the mold surface on the inner surface of the cylindrical mold before molding the thermosetting resins which are the raw materials of the endless belts. However, the silicone rubbers are preferred because of the characteristics thereof as a releasing agent. Although spraying, hand-coating and the like are known as the methods of applying a releasing agent to a mold surface, such methods cannot correct the eccentricity of the cylindrical mold inner surface but rather detrimentally affect it.

The present invention will now be described in more detail in the following Example, with reference to the accompanying drawing, in which;

FIG. 1 is a sectional view of an example of the centrifugal molding device used to carry out the method of the present invention.

EXAMPLE

As shown in FIG. 1, a box-type heating jacket 1 covered around the periphery thereof by a heat insulator layer 3 is provided with a path 2 in which a heating fluid circulates, and a cover 4 with which the opening of the heating jacket 1 is closed. One end of a rotation shaft 6 which can be rotated by a motor 5 protrudes through the bottom wall of the heating jacket 1 and is fixed to the bottom end of a cylindrical mold 7 provided in the heating jacket 1. The centrifugal molding device thus constructed was used to prepare a thinwalled endless belt as described below:

The cylindrical mold having an inner diameter of 210 mm and a length of 250 mm was rotated at a speed of 1000 rpm. Into this cylindrical mold, a mixture of 100 parts by weight of KE 1800A, 10 parts by weight of KE 1800B, 2 parts by weight of KE 1800C, which are cold-curable silicone rubbers available from Shin-Etsu Chemical Co., Ltd., Japan, 50 parts by weight of silicone oil and 50 parts by weight of toluene was introduced. The rotation was continued for further 10–15 minutes to centrifugemold the mixture on the inner surface of the cylindrical mold. This mixture was then maintained in an atmosphere at 140° C. for 120 minutes and thus was allowed to harden to form a hardened layer of silicone rubber on the inner surface of the cylindrical mold. The inner diameter of the obtained hardened layer of silicone rubber was 204 mm.

Thereafter, the cylindrical mold was rotated at a speed of 120 rpm. In this condition, a mixture of 35 g. of Torenies #2000 (varnish of totally aromatic polyimide type, available from Toray Industries Inc., Japan) and 30 g. of a solvent for the aforesaid varnish (containing N-methyl-2-pyrrolidone as main ingredient and also N,N-dimethylacetamide, etc., available from Toray Industries Inc., Japan) was introduced on the inner surface of the hardened layer of silicone rubber. The rotation speed was raised to 1000 rpm., followed by heating. The temperature of the atmosphere was gradually raised to 120°–130° C., and the rotation was continued for further 30 minutes at the aforesaid speed. Then, the rotation was stopped, and the formed cylindrical film of the polyimide resin was separated from the hardened layer of silicone rubber. The resulting cylindrical film was then fitted onto a cylindrical silicone drum having an outer diameter of 204 mm, and heated at 300° C. for 30 minutes to complete the hardening. The completely hardened cylindrical film was taken out of the silicone drum to give an endless belt. This endless belt has a circumferential length of 640 mm, a width of 180 mm and a thickness of 0.05 mm. Measurement of the thickness distribution revealed that the thickness error was ±5 μm.

On the other hand, the silicone rubber dissolved in a solvent was coated onto the inner surface of a cylindrical metal mold having an inner diameter of 204 mm and then hardened. A mixture of the above-described varnish and the solvent was introduced thereinto as a releasing agent. Thus, a belt was prepared in the same manner as described above, so that it might have a thickness of 0.05 mm. However, this belt showed thickness errors of ±20 μm at some sections and could not be used as an article of commerce.

According to the method of the present invention, it is possible to mold a thin endless belt having more uniform thickness than before by use of the centrifugal molding method.

We claim:

1. A method of producing a thin-walled endless belt having a thickness between 30 and 500 microns by centrifugal molding which comprises introducing a liquid curable silicone rubber dissolved in a solvent into a rotating cylindrical mold to coat the inner surface of said mold, hardening said liquid curable silicone rubber to form a silicone rubber coated mold surface on the inner surface of said cylindrical mold, and thereafter introducing into said rotating cylindrical mold a thermosetting resin which is at least one heat resistant resin selected from the group consisting of polyimide, polyamide-imide and polybenzimidazole resins dissolved in a volatile solvent onto said inner silicone rubber coated mold surface to coat said inner silicone rubber coated mold surface, then hardening said thermosetting resin and then removing said hardened thermosetting resin from said mold to form said endless belt having a thickness between 30 and 500 microns.

2. The method according to claim 1, wherein said liquid curable silicone rubber is at least one rubber selected from the group consisting of a heat curable silicone rubber and a cold-curable silicone rubber.

3. The method according to claim 2, wherein said liquid curable silicone rubber is at least one rubber selected from the group consisting of a dimethylpolysiloxane, a methylphenylpolysiloxane and a methylvinylpolysiloxane.

4. The method according to claim 1, wherein said solvent is an organic solvent.

5. The method according to claim 4, wherein said organic solvent is at least one solvent selected from the group consisting of a silicone oil, benzene, toluene and xylene.

6. The method according to claim 1, wherein said volatile solvent is at least one solvent from the group consisting of an N-methyl-2-pyrolidone and an N,N-dimethyl acetamide.

7. The method according to claim 1, wherein said liquid curable silicone rubber solution has a concentration of from 20 to 40% and a viscosity of from 0.1 to 5 P.

8. The method according to claim 1, wherein said thermosetting resin solution has a concentration of from 30 to 70% and a viscosity of from 0.5 to 5 P.

9. The method according to claim 1, wherein said liquid curable silicone rubber solution has a concentration of from 20 to 40% and a viscosity of from 0.1 to 5 P, and said thermosetting resin solution has a concentration of from 30 to 70% and a viscosity of from 0.5 to 5 P.

10. The method according to claim 9, wherein said solvent in which said liquid curable silicone rubber is dissolved is at least one solvent selected from the group consisting of a silicone oil, benzene, toluene and xylene, and wherein said volatile solvent is at least one solvent from the group consisting of an N-methyl-2-pyrolidone and an N,N-dimethyl acetamide.

11. The method according to claim 10, wherein said liquid curable silicone rubber is at least one rubber selected from the group consisting of a dimethylpolysiloxane, a methylphenylpolysiloxane and a methylvinylpolysiloxane.

12. The method according to claim 1, wherein said solvent in which said liquid curable silicone rubber is dissolved is at least one solvent selected from the group consisting of a silicone oil, benzene, toluene and xylene, and wherein said volatile solvent is at least one solvent from the group consisting of an N-methyl-2-pyrolidone and an N,N-dimethyl acetamide.

* * * * *